Nov. 28, 1967     D. J. HOWLES     3,355,014
AUTOMATIC SURFACE FLAW DETECTOR
Filed Nov. 6, 1964     6 Sheets-Sheet 1
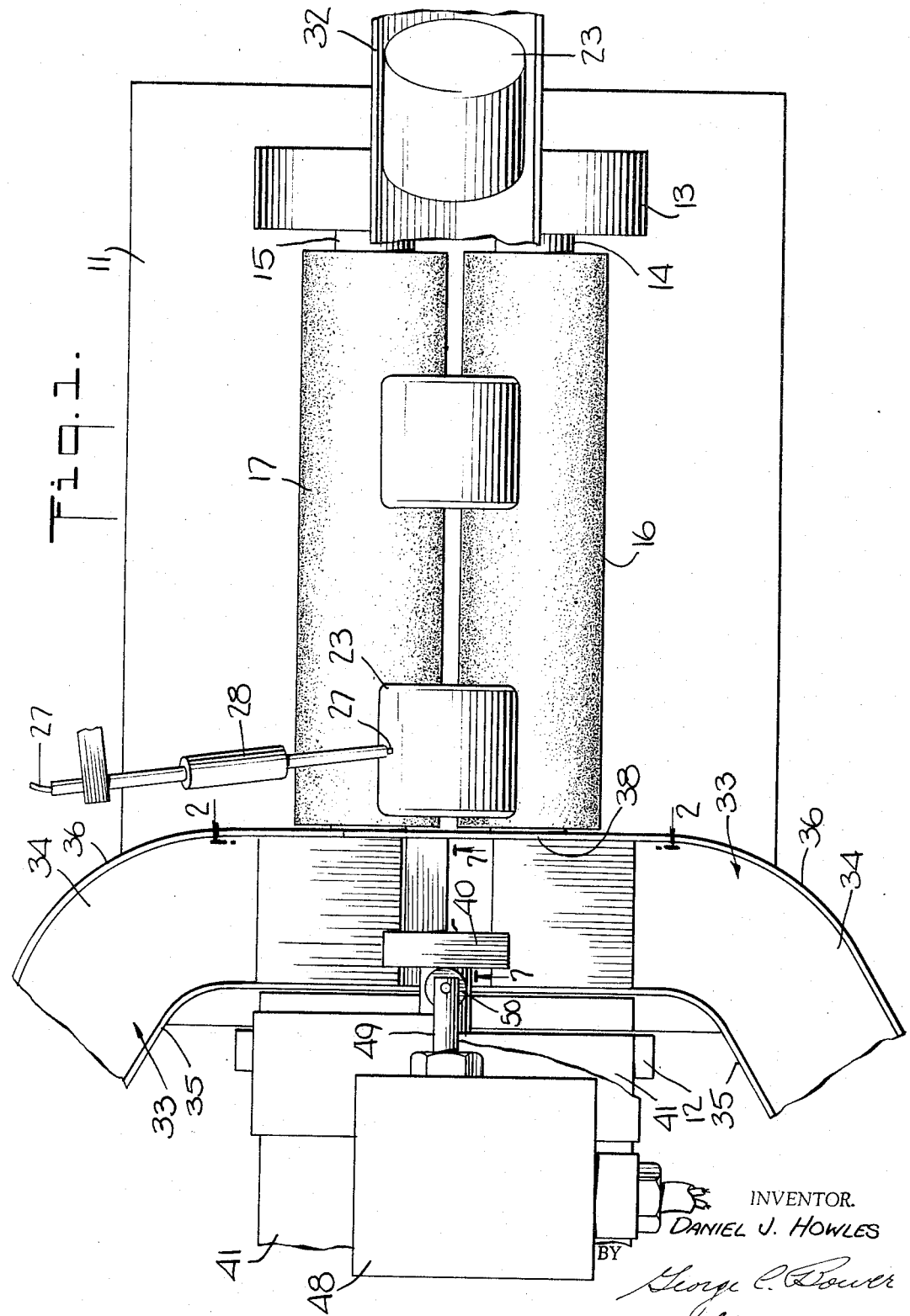
INVENTOR.
DANIEL J. HOWLES
BY George C. Bower
his ATTORNEY

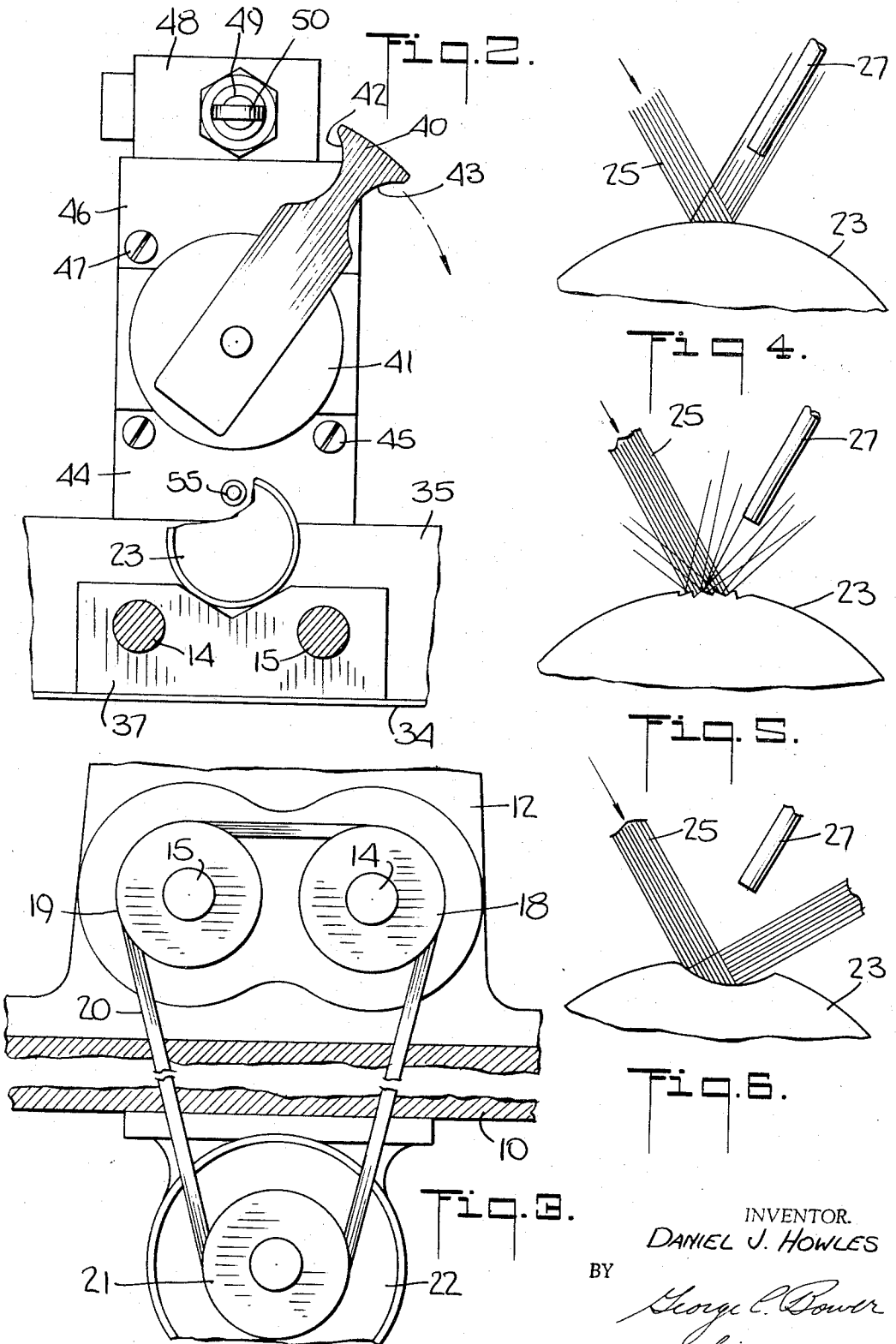

Nov. 28, 1967 D. J. HOWLES 3,355,014
AUTOMATIC SURFACE FLAW DETECTOR
Filed Nov. 6, 1964 6 Sheets-Sheet 3

INVENTOR.
DANIEL J. HOWLES
BY
George C. Bower
his ATTORNEY

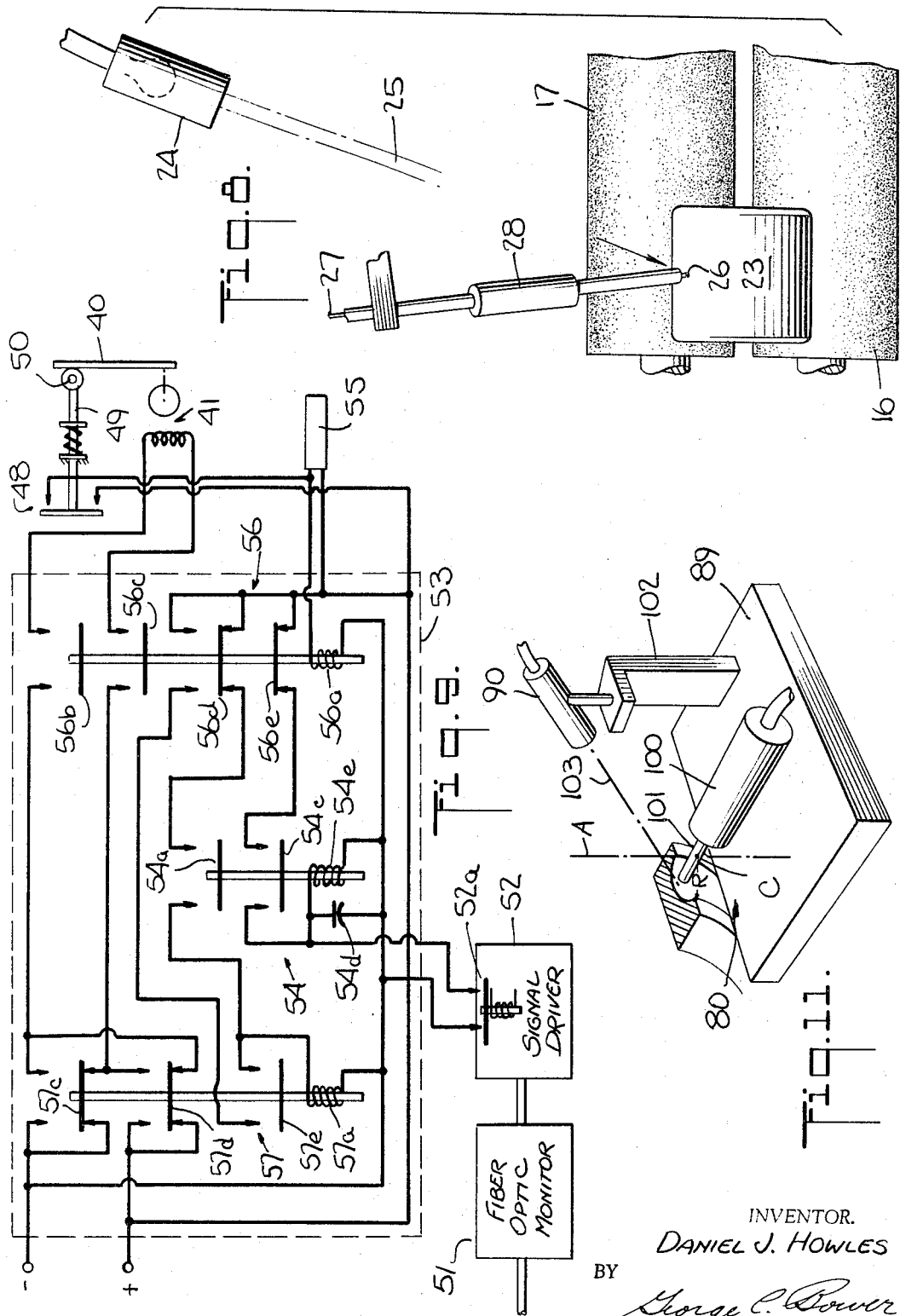

Nov. 28, 1967  D. J. HOWLES  3,355,014
AUTOMATIC SURFACE FLAW DETECTOR
Filed Nov. 6, 1964  6 Sheets-Sheet 5

INVENTOR.
DANIEL J. HOWLES
BY
George C. Bower
his ATTORNEY

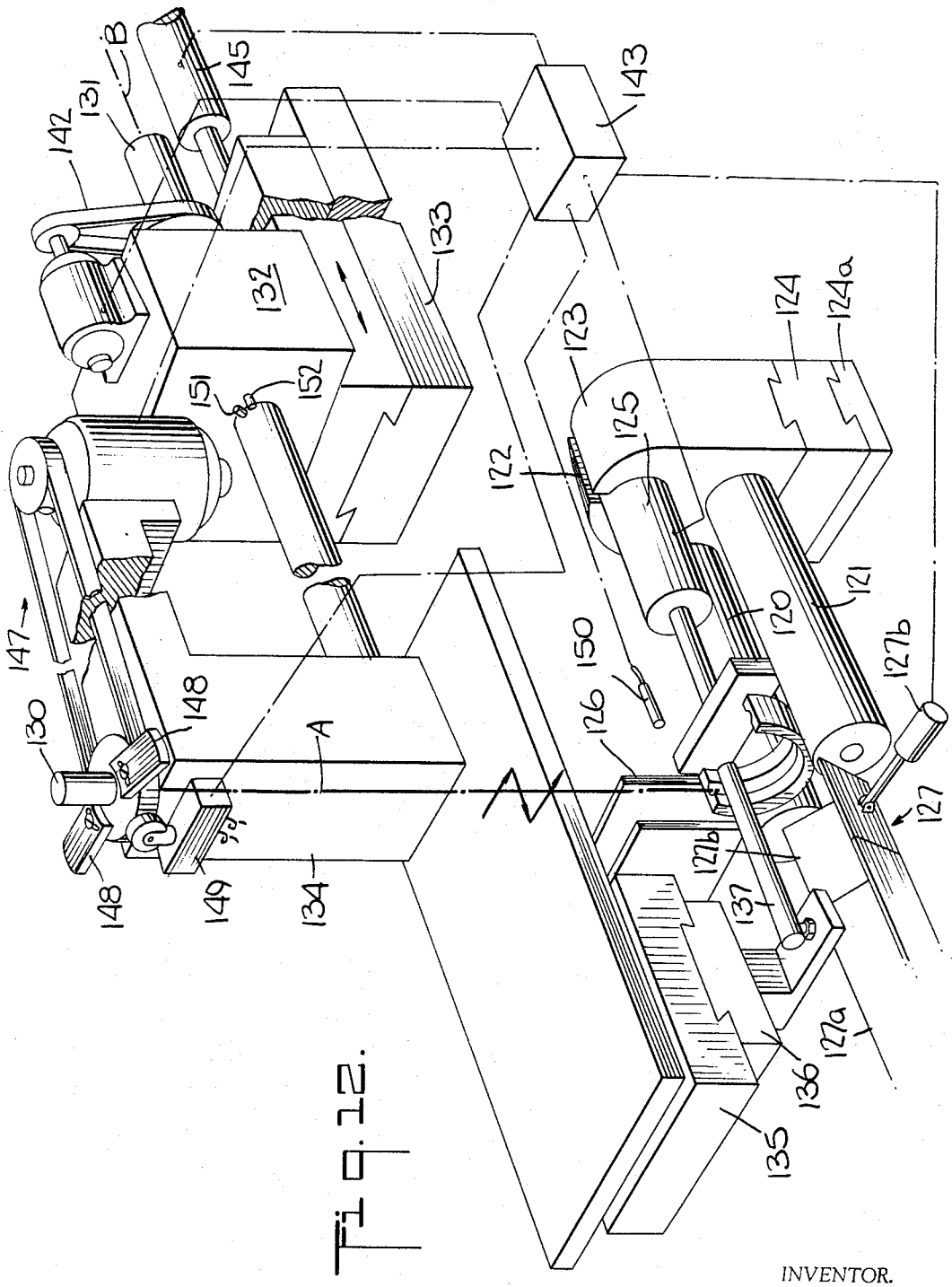

United States Patent Office 3,355,014
Patented Nov. 28, 1967

3,355,014
AUTOMATIC SURFACE FLAW DETECTOR
Daniel J. Howles, Jamestown, N.Y., assignor to TRW Inc., a corporation of Ohio
Filed Nov. 6, 1964, Ser. No. 409,514
7 Claims. (Cl. 209—73)

ABSTRACT OF THE DISCLOSURE

The surfaces of rollers and rings of ball and roller bearings are inspected by a beam of light reflected into the end of a light conducting fiber having a diameter of .002 to .004 inch. The light conducting fiber actuates an electronic monitor to develop an acceptance or rejection signal for operating means separating acceptable and unacceptable rollers or rings. The rollers or rings are mounted on skewed rollers running into the inspecting station as well as rotating them for inspection.

This invention relates to the inspection of metal surfaces by light means and is directed particularly to the automatic inspection of metal surfaces with the inspecting elements not contacting the inspected surface.

In certain types of articles, such as ball and roller bearings, it is desirable to inspect the entire surfaces subjected to the bearing action in order to determine any imperfections in the surface that would lead to premature failure of the bearing in operation. The present methods of inspecting the bearing surfaces are tedious and not completely reliable in locating possible future failure points. Manual methods are subject to the errors of human observation and differences as to the selection of an acceptable piece. It is, therefore, desirable to provide a means which automatically inspects a surface area and accepts areas of an established standard and rejects areas not of an established standard.

In such inspection systems, the finely machined surface should not be engaged by any element and should preferably be inspected by a non-engaging means. Thus brush or feeler type inspection is not acceptable. It is, therefore, desirable to use some type of non-engaging means impinging light on a small portion of a bearing surface and reflecting the light to a sensing apparatus to indicate when the light impinges on an imperfection. These imperfections may be in the form of nicks, scratches, scuffs, corrosion, burnishes and the like.

An object of the invention is to provide a light sensing system for rapidly inspecting an entire surface and detecting imperfections on the surface and automatically rejecting imperfect surfaces.

Another object of the invention is to provide a light inspection system that is reliable and accurately repetitive in inspecting each piece in a similar manner to determine if the piece conforms to a predetermined standard.

Other objects and advantages will be apparent from the following description taken in connection with the drawings, in which FIG. 1 is a top view of a light inspecting system for checking exterior surface of a roller;

FIG. 3 is an end view illustrating the roller drive;

FIGS. 4, 5 and 6 are schematic views illustrating the inspection of a surface by the light beam;

FIG. 7 is a side view of the roller inspecting apparatus with the discharge chute sectionally shown along lines 7—7 of FIG. 1;

FIG. 8 is a top view illustrating the illuminating and sensing apparatus;

FIG. 9 is a schematic view of the electrical circuit;

FIG. 11 is an enlarged fragmentary perspective view of the light inspecting element and ring of the embodiment of FIG. 10;

FIG. 12 is a perspective view of an embodiment for inspecting an inner race of a bearing.

Figure 2:
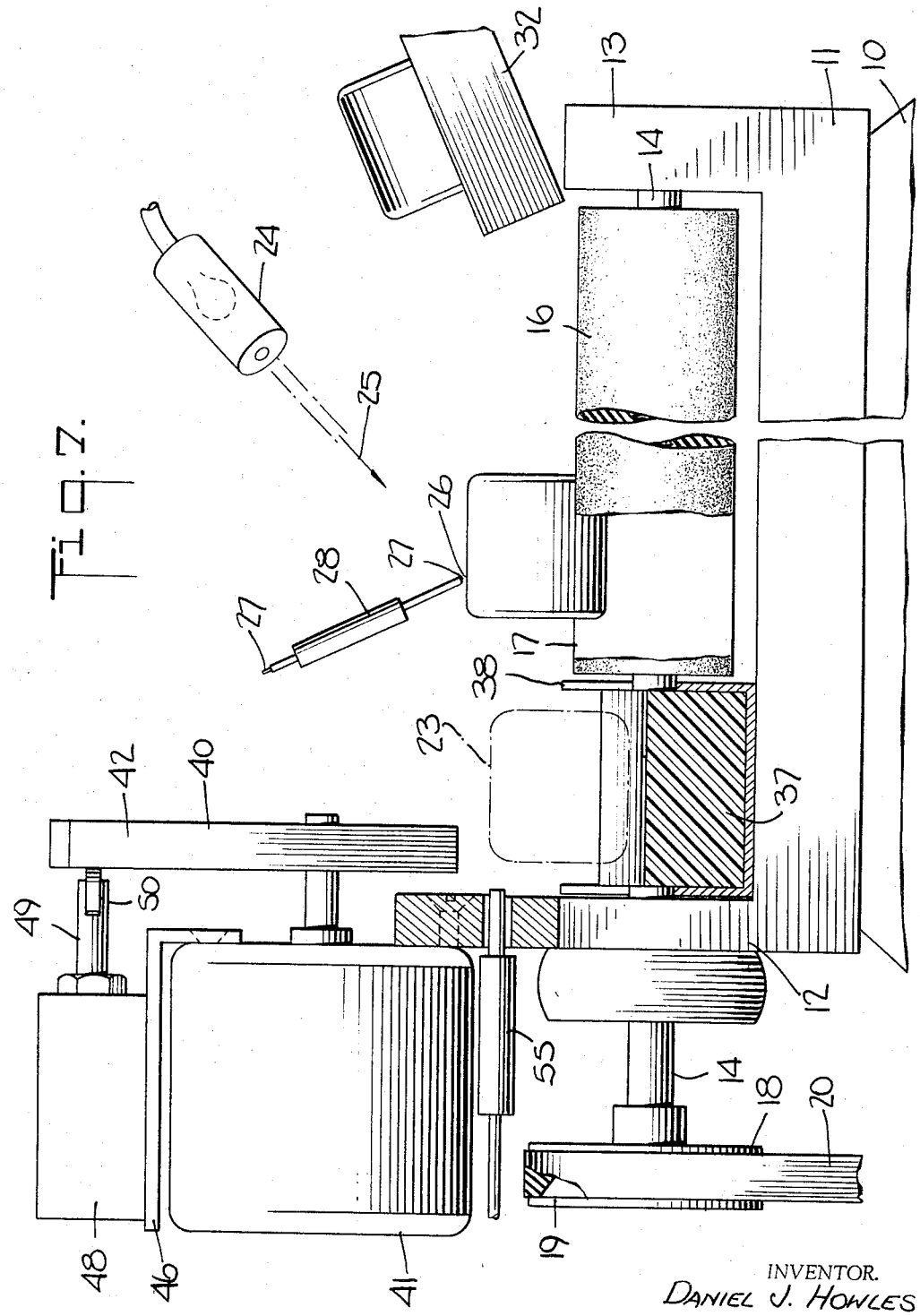
FIG. 2 is a sectional view of the accepting or rejecting apparatus taken along lines 2—2 of FIG. 1.

Referring to FIGS. 1 and 7, an apparatus is illustrated for inspecting the exterior surface of rollers for roller bearings. A main fixed base 10 is illustrated slidably supporting a frame 11. The frame 11 has axially spaced blocks 12 and 13 for rotatably supporting the shafts 14 and 15 having rollers 16 and 17. The rollers are keyed to the shafts 14 and 15 to rotate therewith and the shafts have pulleys 18 and 19 at one end in side by side relation and in the same plane. The pulleys 18 and 19 are connected by the flexible belt 20 to the pulley 21 driven by the electric motor 22 mounted on the fixed base 10, as schematically illustrated in FIG. 3. The belt 20 passes over the tops of the pulleys 18 and 19 to rotate the rollers 16 and 17 in the same direction. The motor is infinitely variable in speed to adjust the rotation of the rollers over a wide range. The article 23 comprising a roller is mounted on the rollers 16 and 17 with its axis parallel to the axes of rollers 16 and 17. The rotation of the rollers 16 and 17 rotates the article 23. The axes of the shafts 14 and 15 and rollers 16 and 17 are slightly skewed to move the article along the rollers so the entire surface of the article is inspected.

A lamp 24 provides a highly focused parallel collimated light beam 25 which impinges on the exterior surface of the roller 23 at a point 26. Light is reflected from this point into the light conducting fiber 27 supported in a steel casing 28. The axis of the light conducting fiber 27 is preferably axially aligned with the reflected beam at the light receiving end of the fiber.

A plurality of rollers may be supported on the rollers 16 and 17 and successively moved past the inspection station. For supplying the articles to be inspected a V-shaped chute 32 is mounted on the fixed base 10. The chute is tilted at an angle and is positioned at the feed end of the rollers 16 and 17 so that the articles to be inspected may slide down onto the rollers 16 and 17 as an article is being discharged at the opposite ends of the rollers 16 and 17. Thus a continuous and successive inspection of articles is provided.

At the discharge end there is a bi-discharge chute 33 having a bottom 34 and side walls 35, 36 extending crosswise to the rollers. A nylon receiving pad 37 is provided in the chute and an opening 38 is provided in the wall 36 to permit the passage of the rollers 23 onto the pad 37. The pad 37 has a V-shaped notch for holding the roller 23 after discharge to permit the acceptance or reject mechanism to operate. The discharge chute 33 extends in both directions for receiving the roller 23 depending upon whether the roller is acceptable or rejected. The roller 23 is displaced from the pad 37 in either direction by the rotating arm 40 which is turned clockwise (FIG. 2) if the roller is accepted, and rotated counterclockwise if the roller is rejected. The direction of rotation is determined by the flaw detection unit and associated circuits connected between the light conducting fiber 27 and the motor 41 rotatably supporting the arm 40. The arm 40 has notches 42 and 43 for engaging the roller 23 and moving it out of the notch up on top of the pad for ejection in either direction. The motor 41 is mounted on a bracket 44 by means of recessed bolts 45. The bracket 44 is mounted on the block 12 and thereby secured to the fixed base 10. On the upper side of the motor 41 an L- shaped bracket 46 is secured to the motor 41 by the recessed bolts 47. The L-shaped bracket extends over the motors and supports an electrical switch 48 having a reciprocal plunger 49 with a roller 50 for actuating the movable contact of the switch 48. The arm 40 on completing the ejection of the roller 23 moves up and engages the roller 50 to force the plunger 49 inwardly, stopping the motor 41. Thus the arm 40 makes a single rotation on the conclusion of the inspection of each roller 23.

An intense parallel collimated beam of light 25 is projected by the lamp 24 which impinges on an extremely small surface area of the roller 23. The light conducting fiber 27 is of a very small diameter in the order of .002 to .004 of an inch and is positioned about .020 inch from the surface for inspecting a surface area of .002 to .004 of an inch wide. The roller advances about .0025 inch per revolution. If an imperfection appears it deflects or scatters the light so as to reduce the light intensity on the end of the light conducting fiber and the amount of light in the fiber will be substantially reduced. The flaw detector is sufficiently sensitive to register this change in light intensity and correspondingly actuate the arm 40 to reject the roller 23 after discharge from the rollers 16 and 17. The axial advance should be less than the diameter of the light conducting fiber to provide an axial overlap of the area inspected.

As illustrated in FIGS. 4, 5 and 6 the collimated light beam 25 strikes a small area of the curved surface of the roller and an intense light beam is reflected therefrom. The light conducting fiber is capable of receiving light impinging on the end surface at an angle of sixty degrees or less. The fiber, however, is preferably axially aligned with the reflected light beam. The fiber is made of glass and will contain the light beam in the fiber as long as the fiber is not sharply bent so as to permit the light to leave the glass. As illustrated in FIG. 1 the steel casing 28 supports the fiber at the inspecting station and the fiber may extend therefrom to the flaw detection unit. For a fiber of .003 inch in diameter the light receiving end is positioned about .020 inch from the surface or about six to seven times the diameter of the fiber. The article is axially moved on each rotation about .0025 inch. Thus for each revolution there is an overlap and any imperfections at the overlap are included with the imperfection on each side of the overlap. This insures a light response that is detectable by the fiber. Flaws of .002 inch or greater are consistently detected. By spacing the fiber further from the surface and positioning a lens between the surface and the fiber, or by using a fiber of smaller diameter, smaller flaws may be consistently detected in the order of .001 inch.

The beam 25 impinging on a smooth and acceptable surface is reflected into the end of the fiber. This intense light is conveyed by the fiber and the flaw detector. If a defect occurs, such as a pit, the light reflected from the pit is scattered since the surfaces are irregular. This substantially reduces the light impinging on the fiber and the light transmitted to the flaw detector. The flaw produces a shadow or a portion of low intensity in the reflected beam. As the shadow passes through the fiber a variation and substantial reduction in the light entering the fiber occurs. Smaller shadows and smaller imperfections can be detected with smaller fibers or lens. The fiber should be in a uniform relation to each portion of the surface as it is presented for inspection in order to avoid variation of the detection system.

This inspection system can detect nicks, pits, scratches, scuffs, marks, stains, corrosion, rust, chatter, burnishes, laps, burrs, seams, surface slag inclusions, flat surfaces and the like if the defect has a dimension in the order of or greater than the diameter of the fiber.

A schematic view of the control circuit is illustrated in FIG. 9. The incandescent light source is preferably supplied from a substantially constant direct current power source, such as a dry cell or a rectified A.C. with an extremely low ripple. Lenses are provided to produce a narrow or collimated beam of light to intensely illuminate a small area on the surface of the roller. The light fiber positioned about .020 of an inch from the surface receives the reflected light if the surface is smooth. On the light impinging upon an irregularity the reflected light instead of passing along the path to the light fiber is reflected at other angles so that the fiber is in a shadow region.

The light fiber may be of a substantial length and is connected to an electronic monitor 51 which has a photo multiplier tube and a cathode follower output tube. The photo multiplier converts the light of the fiber to an electric signal which causes the cathode follower to produce an output signal indicating a flaw or a smooth surface. The output signals are of the same polarity with merely a change in value. The electronic monitor 51 is connected to a signal driver 52. The signal received from the monitor is a continuously changing signal responding to the reflected light from the surface. The signal driver 52 receives these signals and individually integrates them so as to select the signal which is produced by a flaw on the surface of the roller, thus distinguishing the flaw signal from variations produced by minor changes in light intensity and background noise of the equipment.

If a flaw is detected, a negative 11 volt pulse is created, and if no flaw is detected a negative 3 volt pulse is created. The signal driver has a flip-flop circuit which receives the pulse and is actuated by the negative 11 volt pulse to hold the flaw detection until the inspection of the roller is completed. The signal driver has a relay driver connected to the winding 54e. The flip-flop actuates the relay through this relay driver and is cleared when the roller is delivered to the pad 37.

In the foregoing embodiment a single fiber was used for inspecting purposes. However, a surface may be inspected by a plurality of fibers. In such an apparatus an OR gate type circuit is positioned between the cathode follower and the flip-flop circuit and each fiber is connected to the OR gate through a respective photo multiplier and cathode follower.

The signal driver 52 is connected to a logic relay driver 53 which is in turn connected to the motor 41. The logic relay driver 53 has a rotation selector relay 57, a motor actuating relay 56 and a signal responsive relay 54. A unidirectional voltage is applied to the input terminals 53a, 53b. The rotation selector relay 57 has a winding 57a, normally open holding contact 57e and contacts 57c and 57d closed in both the energized and deenergized position. These latter contacts connect the input terminals 53a, 53b to the motor 41 and a change in position of the contacts reverses the polarity of the voltage applied to the motor 41.

The motor actuating relay 56 has a winding 56a holding contacts 56d and 56e, and normally open contacts 56b and 56c. These latter contacts connect the motor 41 to the input terminals 53a, 53b through polarity reversing contacts 57c, 57d. The winding 56a is connected in series with the position proximity indicator 55 and is energized by the indicator when an article or roller 23 is on the pad 37. This changes the position of the contacts 56b, 56c, 56d, 56e energizing the motor 41 and rotating the arm 40 permitting the spring 49 to close contact 48 when the arm moves off the roller 50. This shunts the indicator 55 so the winding 56a remains energized after the roller 23 is removed and until the arm returns to the vertical position and opens the contact 48. The contacts 56b and 56c open stopping the motor.

The signal responsive relay 54 functions to energize relay 57 and reverse the rotation of the motor on receipt of a signal from the fiber optic monitor 51 in the case of a defect. The signal driver 52 has a contact 52a connected in series with the winding 54e of the relay 54 across the input terminals. The relay 54 has a holding contact 54b and a rotation selector energizing contact 54a, both of which are normally open. The contact 54a connects the winding across terminals 53a, 53b through the contact 56e since the contact 52a remains closed only for a sufficient time to energize relay 54. Contact 54a connects the winding 57a to the terminals 53a, 53b through the contact 56d. This energizes the relay 57 closing contact 57e and changing the position of contacts 57c and 57d reversing the polarity. Since relay 54 is actuated at the conclusion of the inspection operation, the indicator 55 is operated energizing relay 56. Contact 56e opens deenergizing relay 54. Contact 56d changes closed positions to maintain relay 57 energized as long as relay 56 is energized. A condenser 56d is connected across winding 54e to hold relay 54 momentarily in the energized position after contact 56c opens.

On completion of the rotation of arm 40 the roller 50 is engaged and the switch 48 opened deenergizing the winding 56a, opening contacts 56b and 56c, stopping the motor 41 and opening contact 56d to return the relay 57 to the normal position if energized. The logic relay driver is then in condition for the completion of the next inspection.

The proximity position indicator contains an R–F oscillator coil which is a part of the resonant circuit oscillator. The oscillator coil has a cathode tap for regenerative feedback. The Hartley circuit is set so that oscillation will be maintained only when Q of the resonant circuit is normal. When metallic materials come near the pickup, Q is reduced, oscillation stops and the output tube conducts to energize a relay which is connected into the logic relay driver unit.

The motor 22 driving the rollers 16 and 17 is a D.C. shunt motor and a speed controller is provided to supply a constant voltage for the field and an adjustable voltage for the armature in order to adjust the speed of the rollers 16 and 17 for proper inspection of the surface.

Figure 10:
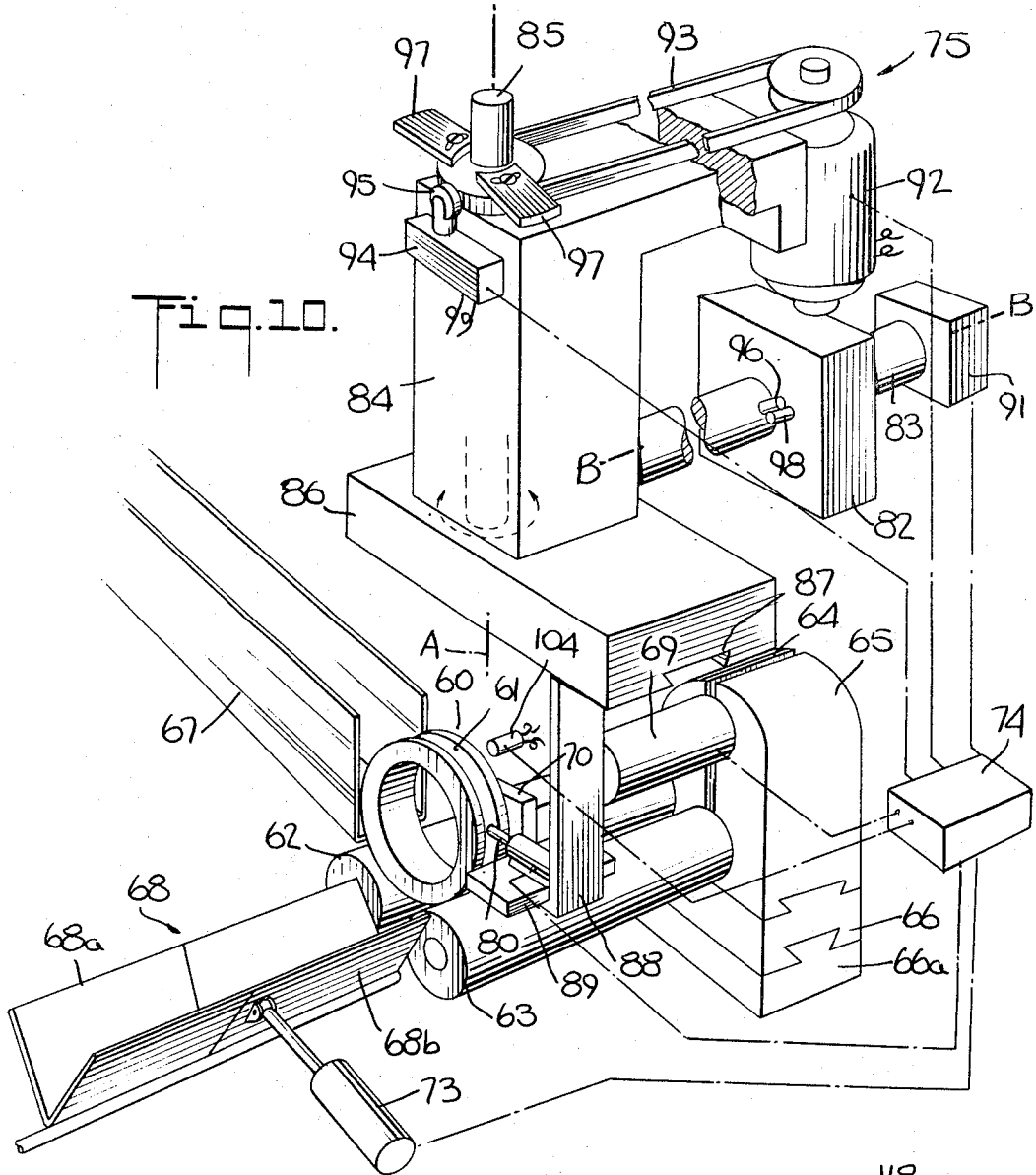
FIG. 10 is a perspective view of an embodiment for inspecting an external race of a bearing ring.

Referring to FIG. 10 a perspective view of the apparatus for inspecting a curved exterior race on a bearing ring is illustrated. The ring 60 is the inner ring of a ball bearing and has a curved race 61 on the exterior surface of the ring. For inspection purposes, the ring is supported on the cylindrical rollers 62 and 63 which rotate in the same direction in order to rotate the ring 60. The rollers 62 and 63 are rotatably supported only in the blocks 64 and 65, respectively, at one end of the rollers. The opposite ends of the rollers 62 and 63 are unsupported. The blocks 64 and 65 are adjustably mounted relative to one another on a slide 66, and the slide is adjustably mounted on the fixed base 66a so that the entire roller assembly can be repositioned for different diameter rings. The ring is orientated vertically and horizontally to provide the proper ring probe relationship by the adjustment of the parts 64, 65 and 66 for different ring diameters. The supporting blocks 64 and 65 may be secured in place in any suitable manner. The rings 60 may be set on the rollers 62 and 63 by hand or may be successively and automatically fed to the rollers from a feed chute 67 extending perpendicularly to the rollers and inclined at an angle thereto. The rollers 62 and 63 are slightly skewed so that on rotation the ring 60 is carried against the pusher 70 of the ejector 69 and is precisely positioned thereby on the rollers 62 and 63. On completion of the inspection cycle the ejector 69 actuates the pusher 70 and the ring 60 is forced axially off of the rollers 62 and 63 onto the discharge means 68. The discharge means 68 is in the form of a V-shaped chute and is separated into a receiver 68a for passing acceptable rings 60 and a rejector 68b aligned with the receiver for ejecting unacceptable rings. The ring 60 is delivered to the rejector and if the ring is acceptable passes on through to the receiver. The rejector 68b is a portion of the chute and is hingedly mounted to tilt and roll the ring 60 off of the discharge means. The rejector may be operated by an actuator 73 connected thereto.

The inspection of the race is performed by the light fiber or probe 80 supported to rotate about an axis A during the inspection period and an axis B for positioning the probe. The shaft 83 is mounted in base 82 to rotate about axis B. The member 84 is fixedly and securely fastened to the shaft 83 to rotate therewith. The shaft 85 is rotatably mounted in the member 84 to turn about axis A. Member 86 is attached to shaft 85 and has a dovetail-shaped groove 87 for slideably supporting the probe support mounting 88 to adjust for different race curvatures. Thus the probe supporting mounting 88 and probe 80 are rotatable about the axis A and about the axis B and adjustable normal to the axis of the ring. The mounting 88 has a platform 89 to which the probe 80 is attached. Also mounted on the platform 89 is the lamp 90 which provides the narrow collimated beam of light.

FIG. 11 is an enlarged fragmentary view of the bearing ring and the platform 89 supporting the lamp 90 and the probe 80. The base 100 supports the single fiber 101 and the post 102 supports the lamp 90 which, in this embodiment, is positioned directly above the probe 80 so that the same plane passes through the beam of light 103 and the fiber 101 and is normal to the ring at the mid-position of the platform. The axis A passes through this plane and intersects the light fiber 101 at a point C. The point C is a distance R from the race surface and corresponds to the radius of curvature of the race in a radial plane. As in the previous embodiment the end of the light fiber 101 is spaced about .020 inch from the race surface.

Motor drive means 75 are provided on the member 84 for oscillating the shaft 85 through an arc and comprise a motor 92, and a belt and pulley drive 93. A switch 94 with a roller 95 is mounted on the member 84 and is engaged by adjustable cams 97. The arc of travel of the probe 80 can be varied by adjusting the position of the cams. The motor is reversed by the cams 97 engaging the switch 94. The platform 89 is oscillated through an arc by the shaft 85 about the axis A so that the light beam 103 and the end of the light fiber 101 sweep or scan the surface of the race maintaining the end of the probe .020 inch therefrom. At the same time the ring 60 is rotated by the rollers 62 and 63.

The shaft 83 is rotated by the motor drive means 91 to swing the probe between an inspection position and retracted position. A pin 96 on the shaft engages a stop 98 to precisely position the probe at the inspection station. The motor drive means 91 and motor drive means 75 are controlled by the timing mechanism 74. A proximity indicator 104 senses the positioning of a ring against the pusher 70 causing the motor drive means 91 to rotate the shaft 83. Pin 96 engages the stop 98 to position the probe 80 in proper relation to the ring 60. The motor 92 is then energized and the probe oscillated to scan the race. On the completion of the inspection, the timing mechanism stops the motor 92 and actuates motor drive means 91 to withdraw the probe to a retracted position for removal of the ring from the rollers. The ejector is then operated by the timing mechanism 74 to push the ring axially off of the rollers onto the rejector of the discharge means. The actuator 73 is operated by the timing mechanism 74 to tilt the ejector 68b if a reject signal has been received.

The light conducting fiber is connected to a circuit similar to the one shown in FIG. 9 and if no flaws are detected the ring moves onto the receiver of the discharge means. However, if the ring fails to meet the standards, the actuator 73 tilts the rejector disposing of the ring.

In FIG. 12 apparatus is shown which inspects the internal race 119 of a bearing ring 118. The means for supporting and turning the ring for inspection and the feed and discharge means are the same as in the embodiment of FIG. 10. The rollers 120 and 121 are rotatably supported at one end only in the blocks 122 and 123, respectively. The blocks 122 and 123 are slideably mounted on a slide 124 which is slideably mounted on a fixed base 124a so that the entire roller assembly can be adjusted to accommodate different diameter bearing rings for vertical and horizontal orientation to provide proper ring probe relation. The ejector 125 is mounted on block 122 and has a pusher 125a providing a stop for the bearing ring and for ejecting the ring from the rollers 120 and 121. The feed chute 126 is similar to the feed chute 67 and the discharge means 127 has a receiver 127a for acceptable rings and a rejector 127b for unacceptable rings in a similar manner to the rejector 68b.

In the inspection of the race 119 on the inside surface of the ring 118 the light conducting fiber 139 (FIG. 13) is mounted on an axially extending platform 137 and curved by a casing 138 to extend normal to the bearing ring. In order to insert and remove the light fiber 139 from within the ring the shaft 131 is rotatably supported in a block 132 which is slideably mounted on a base 133. The shaft 131 is thus rotated about axis B and moved axially therealong to move the supporting platform 137 axially in and out of the ring and to rotate it clear of the discharge path of the ring from the rollers 120 and 121. In order to scan the curved surface of the race, the platform 137 is rotated by supported shaft 130 in the member 134 which is attached to the shaft 131. The platform 137 can be adjusted for different raceway curvatures by slideably mounting the block 136 supporting the platform 137 in the member 135 secured to the shaft 130. The shaft 130 is rotated through an arc by the motor drive means 147 mounted on member 134. The direction of rotation of the motor and the degree of the arc of travel is controlled by the cams 148 and the switch 149 engaged by the cams at each end of the arc.

Various means may be provided to rotate the shaft 131 and slide the block 132. A motor drive means 142 rotates the shaft and an actuating mechanism 145 moves the block 132. Starting in a retracted position the shaft 131 rotates the platform 137 to a first intermediate position. The actuating mechanism 145 slides the block 132 to move the platform 137 axially within the ring to a second intermediate position and the shaft 131 is then further rotated by the motor drive means 142 to position the probe for inspection of the race. For removal of the platform with the probe, the reverse sequence is followed.

The motor drive means 142 and actuating mechanism 145 may be controlled by a timing mechanism 143 which is initiated by a proximity detector 150 at the inspection station. The timing mechanism 143 may also control the ejector on the return of the platform 137 to the retracted position. A pin 151 on the shaft 131 engages a stop 152 on the block 132 to precisely position the light fiber a distance in the order of .020 inch from the surface of the race.

Figure 13:
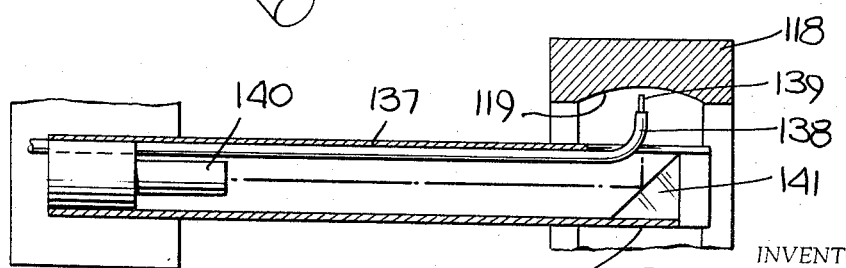
FIG. 13 is an enlarged fragmentary perspective view of the light inspecting element and ring of the embodiment of FIG. 12.

As illustrated in FIG. 13, the light fiber 139 is also positioned so that it passes through a point C coincident with the center of curvature of the race and of the axis A, as described in connection with the previous embodiment, so that the ligh fiber remains the same distance from the race over the arc of travel. The illuminating beam of light may be provided by locating a lamp 140 exterior to the ring and a prism 141 at the end within the ring to reflect the beam of light in the plane of the axis A.

At the completion of the inspection cycle and the retraction of the light fiber, the ejector 146 forces the ring off the rollers 120, 121. If the ring is unacceptable the rejector 127b is pivoted by an actuator 153 responsive to the timing mechanism 143, in a similar manner to the embodiment of FIG. 10, and if acceptable the ring moves on to receiver 127a.

It is thus seen that with the foregoing equipment rollers may be successively inspected by light responsive and electronic means and the rollers automatically accepted or rejected. This eliminates personal judgment upon the part of an operator which may vary materially between operators, and makes the selection of a roller depend upon parameters that are repetitive in nature so that each roller will pass a minimum standard. Further, the operation provides for the automatic inspection of successive rollers with the mere feeding of the rollers to the apparatus. A roller may be accurately inspected within a short period of time, greatly increasing the number of rollers that can be checked per hour.

I claim:
1. An automatic surface inspection device comprising two slightly skewed rollers with means for rotating the rollers in the same direction, means for directing a beam of light onto a rotatable workpiece on the rollers and a light conducting means having a small light receiving area from an acceptable surface, electrical means connected to said light conducting means for converting the received light into an electrical signal for selecting or rejecting the article, an article holding means at the discharge end of the rollers, means connected to said electrical means and operated in response to the electrical signal for moving said article in different directions depending upon the presence of detected flaws.

2. An article inspection device comprising a base, two rollers in side by side relation rotatably mounted on the base for supporting a cylindrical article thereon, adjustable speed means coupled to said rollers for rotating said article thereon and said rollers being slightly skewed to move said article therealong and to discharge said article at one end, supply means at the other end of said rollers for successively feeding articles on said rollers, retention means at the other end of said rollers for retaining a discharged article, light emitting means for directing a beam of light on the surface of an article on said rollers defining a helical path with overlapping turns, light conducting means having a small surface area mounted on said base and positioned to receive a reflected beam of light from said helical path of overlapping turns on a smooth surface area and a reduced beam of light from an imperfect surface area, electrical means connected to said light conducting means for receiving light therefrom and converting received light to electrical signals discriminating between surface conditions, a motor rotatable in two directions and having a selective arm moving in either direction past the retention means, connecting means between said electrical means and said motor responsive to the discriminating electrical signals to rotate the motor in opposite directions depending on the signals and including article sensing means at said retention position for completing the energization of the motor for actuation.

3. An apparatus for inspecting the curved surface of an article comprising means for directing a narrow beam of light on an article to be inspected for reflection therefrom, light conductive means having a light receptive surface in the order of the size of the flaws to be detected for receiving a narrow beam of light from the surface of an article, means for supporting said light conductive means to rotate said light conductive means about the center of curvature of the curved surface to be inspected and in a plane normal thereto for maintaining the distance of the light conductive means from the surface constant on scanning the curved surface for receiving light from acceptable surface portions and having a substantial reduction in received light from unacceptable surface portions, electrical means connected to said light conductive means for converting received light into flaw detection signals and means connected to said electrical means separating acceptable articles from unacceptable articles in accordance with the flaw detection signals.

4. An apparatus as set forth in claim 3 wherein means are provided to rotate an article under inspection transverse to the rotation of the light conductive means for scanning of a continuous surface by the light conductive means.

5. Apparatus for inspecting the curved races of bearing rings comprising a base, two slightly skewed rollers in side by side relation rotatably mounted on the base for supporting a bearing ring having a curved race, means for driving said rollers to rotate a ring mounted thereon about its axis and to move the ring along to axis into an inspection station, a support with means forming a narrow beam of light and with light conductive means having a light receptive surface mounted on said support to direct a beam of light on the curved race and reflect the beam from a flawless surface onto said light receptive surface, means for mounting said support to oscillate said support about an axis passing through the center of curvature of the race and in the center plane of a ring supported on said rollers with the light conductive means and light means in a plane containing said axis for scanning at a constant distance from the race of a supported ring, and means for rotating said support about a second axis to and from an inspection position to permit the supply and discharge of bearing rings to and from said rollers.

6. Apparatus for inspecting the curved races of bearing rings comprising a base, two slightly skewed rollers in side by side relation rotatably mounted on the base for supporting a bearing ring having a curved race, means for driving said rollers to rotate a ring mounted thereon about it axis and to move the ring along to axis into an inspection station, light producing means for forming a narrow beam of light, light conductive means having a light receptive surface, a mounting for holding said light producing and said light conductive means in a plane, means for rotatably supporting said mounting about a first axis to move said mounting between a cleared position for supply and ejection of rings on said rollers and an inspection position for checking the surface of a race including means for oscillating said mounting at the inspection postion about a second axis in the plane of said light producing and light conductive means to maintain the light producing and light conductive means a constant distance from the face of a bearing ring supported on said rollers when the second axis passes through the center of curvature of the race.

7. Apparatus as set forth in claim 6 wherein said means for rotatably supporting said mounting about a first axis is slidably mounted to longitudinally move said mounting on movement to and from the inspection position.

References Cited
UNITED STATES PATENTS

| | | | |
|---|---|---|---|
| 2,635,194 | 4/1953 | Kellogg et al. | 250—224 X |
| 2,857,800 | 10/1958 | Stevens | 250—224 X |
| 3,235,672 | 2/1966 | Beguin | 250—227 |
| 3,278,754 | 10/1966 | Wallace | 250—223 |

RALPH G. NILSON, *Primary Examiner.*

DAVID J. WALL, *Examiner.*